United States Patent [19]
Nelson et al.

[11] Patent Number: 5,845,577
[45] Date of Patent: Dec. 8, 1998

[54] NEWSPAPER STAND WITH PRINTER FOR PRINTING UNDATED NEWS

[76] Inventors: Nadine Nelson; Aloysius Nelson, both of 10 Keys Ct., Pensacola, Fla. 32505-7326

[21] Appl. No.: 788,576

[22] Filed: Jan. 24, 1997

[51] Int. Cl.⁶ ........................................ A47F 1/04
[52] U.S. Cl. .................. 101/494; 400/719; 705/26; 379/91.01; 221/154; 364/479.05
[58] Field of Search .................. 235/381, 379; 379/91.01, 91.12, 91.1; 101/494; 400/719; 705/26; 221/131, 154; 364/479.05

[56] References Cited

U.S. PATENT DOCUMENTS

| | | | |
|---|---|---|---|
| 4,140,242 | 2/1979 | Muller et al. | 221/154 |
| 4,273,256 | 6/1981 | Wenner | 221/154 |
| 4,331,261 | 5/1982 | Brown | 221/154 |
| 5,143,251 | 9/1992 | Kahanek et al. | 221/154 |
| 5,368,189 | 11/1994 | Griffith | 221/90 |
| 5,561,709 | 10/1996 | Remillard | 379/96 |

FOREIGN PATENT DOCUMENTS 0 535 630 A2  4/1993  European Pat. Off. .
6-333156  12/1994  Japan .

Primary Examiner—Edgar Burr
Assistant Examiner—Dave A Ghatt
Attorney, Agent, or Firm—Patent & Trademark Services; Thomas Zack; Joseph H. McGlynn

[57] ABSTRACT

A dispensing machine for publications such as newspapers. Signals transmitted from remote sources are received by the machine, processed and then printed on the publication at the dispenser's site prior to being dispensed. Currency, subscription or debit credit cards, or all of them, may be used to permit the dispensing of the publication from the machine one-at-a-time. There is a visual display on the dispenser which shows the most recent information to be printed on the publication. Provision is made to encode specific areas of interest on inserted subscription cards such that the same will be displayed and printed on any dispensed publications. For newspapers, the most up to date headlines or information selected on from a subject menu (e.g., sports, business, national or local news, etc.) can be printed on a blank section of the newspaper to be dispensed, thus giving the readers the most recent news available.

7 Claims, 2 Drawing Sheets

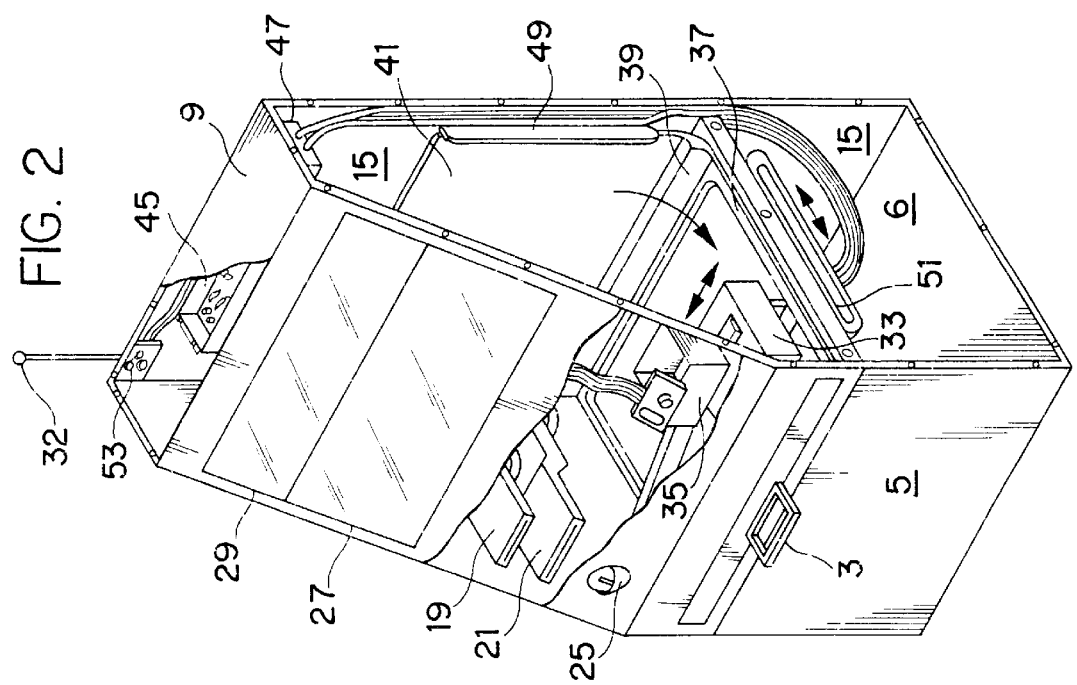
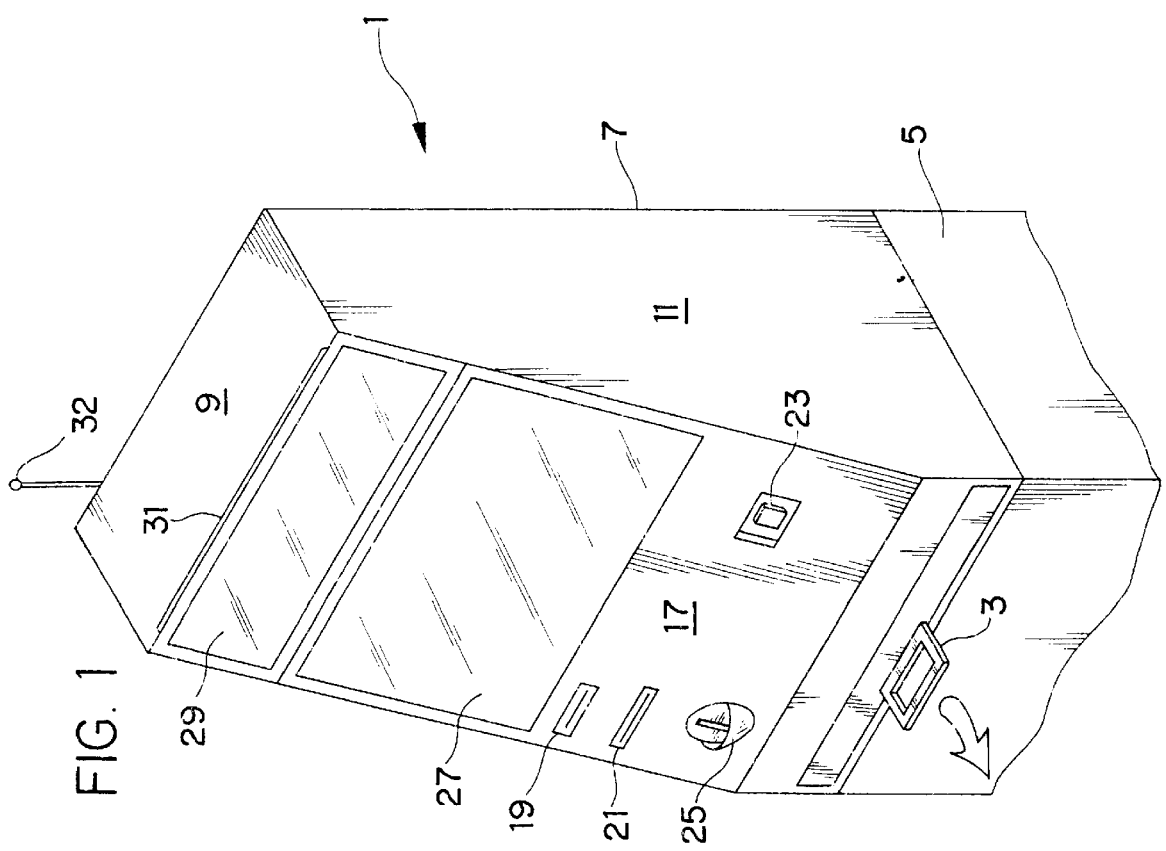

NEWSPAPER STAND WITH PRINTER FOR PRINTING UNDATED NEWS

BACKGROUND OF THE INVENTION

Over the years newspapers were first dispensed to the public by newsboys who collected the charge for the paper. This proved to be too labor intensive and resulted in the advent of non-attended newspaper dispensing machines which could be conveniently located at busy points to permit the dispensing of newspapers after the proper charge has been inserted. Such machines are now common place in most large cities.

Normally, these newspaper dispensing machines permit the user to insert one or more coins or dollars bills which then, if the proper amount has been deposited, opens a door or other restricting device, to permit the user to obtain the paper. If the amount deposited is greater than the charge, change is dispensed along with the newspaper. In some cases, the newspaper is moved after the proper amount of charge is inserted such that the paper is totally or partially discharged from the dispensing machine. Regardless of how dispensed the reader is receiving a newspaper which has been previously printed and then delivered to the newspaper dispensing machine. Thus, the news printed thereon, especially on the front page, is somewhat dated even if only a few minutes old. The present invention seeks to speed up the delivery of the most recent news by providing for a newspaper dispensing machine which can receive transmitted signals, decode the same and then print the transmitted information on the newspaper as detailed herein.

DESCRIPTION OF THE PRIOR ART

Newspaper and publication dispensing machines take on a variety of configurations and employ a variety of mechanisms in their operation. For example, in U.S. Pat. No. 4,140,242 to Muller et al, a mechanism to dispense a single-copy of a printed newspaper or publication using a coin-operated vending machine which can regulate the size of the dispensing opening based on the thickness of the printed matter is disclosed.

In the Wenner patent (U.S. Pat. No. 4,273,256), the printed product dispenser has a manually rotatable dispensing knob and a height regulator mechanism to regulate the distance a transport plate travels.

The Brown invention (U.S. Pat. No. 4,331,261) discloses a single newspaper dispenser that retrofits to an existing newspaper stand. A sliding table fits within the stand on the top of the newspapers and slides out when the stand door is opened.

In U.S. Pat. No. 5,143,251 to Kahanek et al a single newspaper dispenser is disclosed which fits into a standard dispenser to prevent removal of more than one newspaper copy. In contrast to such dispensers, the present invention provides for a dispenser which would have the most up to date news received, processed and printed on it. Additionally, a subscription or credit type card can be inserted in the dispensing machine to open and charge the user's card or account to dispense the stored publication as more further set forth in this specification.

SUMMARY OF THE INVENTION

This invention relates to dispensing machine for newspapers or other publications wherein information signals are transmitted from remote sources, processed and then printed on the publication at the dispenser's site prior to being dispensed. Either subscription or credit cards, or both, may be used to permit the dispensing of the publication from the machine.

It is the primary object of the present invention to provide for an improved apparatus which will receive transmitted data signals, process them and then, based on the data information, print the processed information on a publication to be dispensed.

Another object is to provide for such a publication dispenser which permits subscription or credit cards to be used to credit or charge the user's card account in the dispensing process.

These and other objects and advantages of the present invention will become apparent to readers from a consideration of the ensuing description and the accompanying drawings.

BRIEF DESCRIPTION OF THE DRAWINGS

FIG. 1 is a front perspective view of the preferred embodiment's publication dispenser.

FIG. 2 is another front perspective view of the FIG. 1 dispenser with multiple wall section's cut out to show its internal workings before or after a publication has been dispensed.

DESCRIPTION OF THE PREFERRED EMBODIMENT

Figure 3:
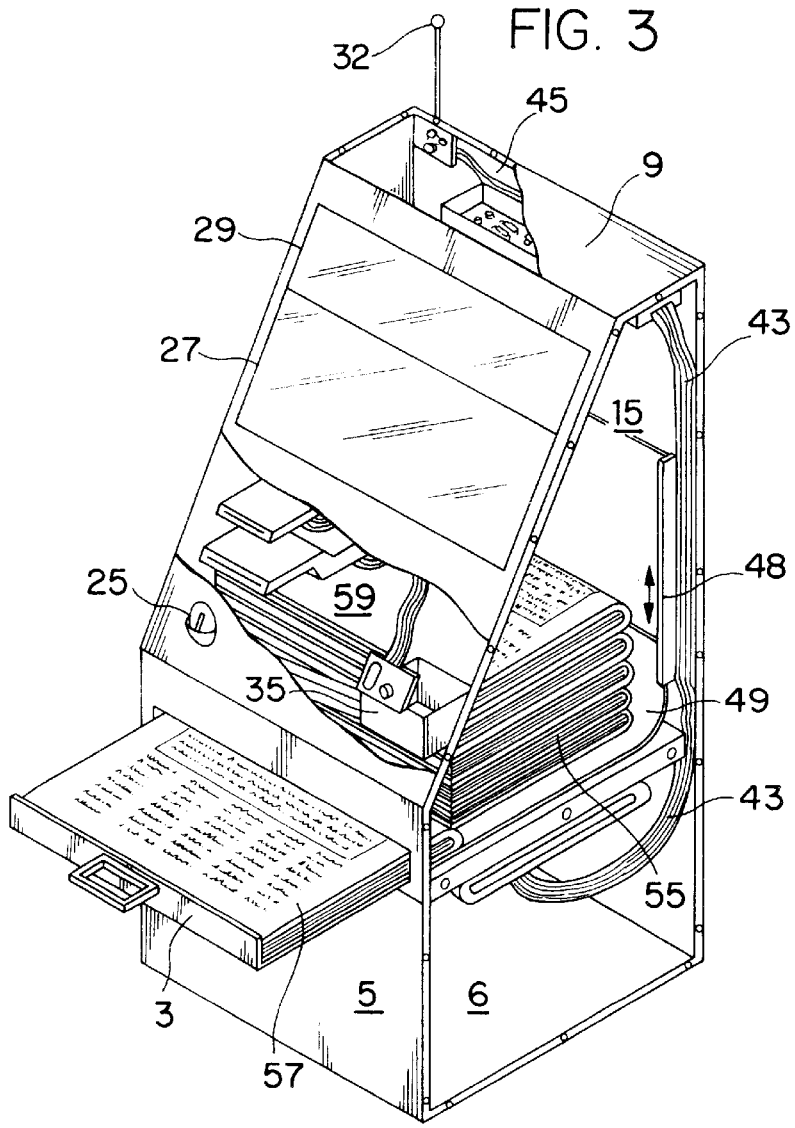
FIG. 3 shows still another front perspective view, similar to FIG. 2, except that the publication is in the process of being dispensed.

FIG. 1 is a front perspective view of the preferred embodiment's publication dispenser housing 1. This dispenser provides a housing used to store publications, such as newspapers, move the publications one-at-a-time when the proper charge has been made to permit their dispensing at pull handled drawer 3, and to contain appropriate electronics and mechanisms to receive transmitted signals, process the signals and then print intelligent data on the stored publication based thereon. The dispenser also houses appropriate mechanical and electronic components to receive currency, coins, bills or both, or cards to determine the proper amount to be charged and to dispense change or render a charge to the card.

In this figure the dispenser housing 1 is made of an outer weather-proof plastic/metal material with a lower stainless steel box-like base 5 with an opened top and closed bottom 6 and an upper section 7 mounted on this base's top. This upper section 7 is enclosed on all exposed sides with a flat top portion 9, two identical opposite side panels 11 and 13 (not shown), a back panel 15 (not shown) and a front facing users' panel 17. The users' panel contains appropriate slots to insert subscription or credit cards 19, bills 21 and coins 23. The panel 17 also has a coin return slot 25 and two separate visual display areas 27 and 29.

Display area 27 is a conventional "fixed" advertising or other publications holding and display area with a transparent outer window. When the panel 17 is opened at its top hinge 31 such publication can be inserted into the area 27. Above area 27 is the scrolling electronic visual display area 29. Area 29 is to display "changeable" information such as advertising or the most recent transmitted news which has been received and processed to yield intelligent printed matter such as up-to-date headlines of the minute. As the name implies, information displayed in area 29 is programmable and will, if news, most likely change on a minute to minute basis or faster, if necessary, to reflect the most recent fast breaking news headlines.

Extending from the top 9 is the signal receiving antenna 32 used to receive transmitted signals from a remote transmitting source, such as a news radio or television station. Once received these signals are converted into digital signals, then processed by a computer and then printed out for display in area 29. The electronics and computer to convert the signal to a digital format and give intelligent human meaning to these signals and then print this meaning are all contained within the upper part of section 7.

In one embodiment the transmitted information was digitized and then converted by a basic level central processing unit which was connected to an ink jet printer used to print the displayed information. If the publication stored in dispenser 1 was a newspaper, then part of it, such as its front page, could be continuously changed by printing and display in area 29 the most recent headlines. A subject menu (e.g., sports, business, weather, national or local news, etc.) can also be continuously sequentially display in area 29 for a short time to permit a user to select the desired subject matter from this menu by inserting the coin or card when the desired subject is displayed. This results in the printer printing the most recent information for the selected subject on a blank section of the newspaper to be dispensed.

FIG. 2 is another front perspective view of the FIG. 1 dispenser with multiple wall section's cut out to show its internal workings before or after a publication has been dispensed. The card slot 19 may use a subscription card to act as a debit card charging the user a predetermined fee for each publication (e.g., newspaper, encyclopedia information) to be dispensed. A conventional magnetic strip on the card may be coded with information concerning the user's main area of news interest. This allows the ink jet printer 33 to print and display a specialized headline of particular interest to the user, such as sports or business news.

The bill slot 21 has a conventional optical scanning mechanism (not shown) located behind it to determine the amount and whether the inserted bill is authentic. Coins deposited are sent to container 35 which can store or dispense any change needed via coin return outlet 25. A sliding newspaper dispensing tray 37, shown empty of publications, with its external handle is outfitted with a mechanism to permit only one publication to be dispensed in the tray at a time. This is done by using a plastic wedge 39 located at the back of the dispensing tray 37 which in conjunction with a sliding plastic "bearing" 41 slides across the underside of the stacked newspapers above the one being dispensed. The result is the dispensing of a single publication or newspaper.

A power supply for all of the electrically operated components is located at the bottom rear and is attached to a standard 120 alternating current voltage source-none of these being shown. A printer cable plug 43 connects printer 33 to the cellular/modem communication electronics and computer 45 via upper printer cable plug connection 47. Also shown is the sliding plastic bearing guide 49 used to guide 41 and the linear print bearing 51 used to permit dispensing tray 37 to move easily when released.

The cellular/modem communication electronics and computer 45 contain conventional electronic and computer components used to process transmitted signal received from connected antenna electronics 53 and antenna 32 to output a command signal to the ink jet printer 33. This command signal in digital format acts like a conventional home ink jet or laser printer to print intelligent information on the newspaper sheet available to it. In most cases this sheet would be the paper front page.

FIG. 3 shows still another front perspective view, similar to FIG. 2, except that publications (here a newspaper) 55 are stacked in the dispenser and in the process of being dispensed one-at-a-time as is the single copy 57 from the spring loaded pull out handled drawer 3. In this view the sliding plastic bearing guide 49 has moved down under the next to be dispensed copy and over the most recently dispensed copy. The printer 33 (not shown) is located such that it can imprint processed data on the next to be released newspaper in a blank facing portion 59 shown on the uppermost stacked copy. As contemplated most of the newspaper's printed matter will have been previously printed with only a small part being left blank to add the most recent germane news.

Figure 4:
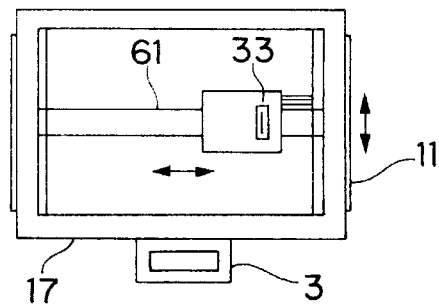
FIG. 4 shows a top sectional view of the dispenser with its stored publication's pull drawer and printer.

FIG. 4 shows a top sectional view of the dispenser with its publication's pull drawer 3 and printer 33. The printer on can move on shaft 61 in the direction of the arrows parallel to the front panel 5 to print data on a publication's blank facing portion. The spring loaded pull out handle drawer 3 is located below the printer and acts as a movable support for the to be dispensed publication.

The term "publication" as used herein is used to encompass all types of printed publications such as newspapers, magazines, advertising brochures, political announcements, encyclopedia information, etc. and is not limited to newspapers, per se. This invention is applicable to anywhere there is a desire to add or change printed information on a machine dispensable publication. Payment for this publication can be either by cash, coin or bill, by a credit card or by a subscription card having an amount of cash encoded on the card.

The top plastic housing 7 or chassis of the dispenser can be manufactured of polyethylene plastic material using the blow molding process. The process uses a parison (hollow tube) of plastic, and at minimum of a two part mold. This parison is heat softened and a two part cavity mold is placed around the tube. The mold pinches off one end of the tube while very hot air is blown into the other end of the plastic tube. This causes the tube to blow up like a balloon against the mold and take its shape. The two part mold is opened and the enclosure ejected and allowed to cool and harden. Thereafter second stage cutting and trimming by hand or machine can take place. Polyethylene plastic is often used in this process because of its waxy feeling and its ability to slide well within the mold. Textures can also be added to the outer surface to give it the appearance of dispenser's upper section 7.

The lower base 5 can be manufactured of stainless steel using metal stamping and punching processes. Metal stamping is a process whereby flat metal is formed between two parts of a die under tremendous pressure. The metal can be punched, formed and shaped in these dies, many times in one process, and spot welding of separate components can be employed to complete the assembly of sheet metal components. In this case, the stamped metal may be stainless steel or plated carbon steel to prevent rusting. The metal punching process involves a male and female die, both are which are machined into the shape of the desired finished product. The dies are made of hardened tool steel, and are placed in the jaws of a hydraulic press. In operation, the steel material to be punched is placed between the two die components and the hydraulic press activated. The two dies quickly "punch out" the desired shape from the sheet metal, producing the desired metal component.

The electronics components 45 and antenna electronics 53 are manufactured using fiberglass printed circuit boards using a combination of conventional and surface mount electronic components. Surface mount components are much smaller than conventional electronic components but perform the same electrical function. Components, one installed (either by hand or robots), are massed soldered to the printed circuit board using either the wave soldering process or the drag soldering process.

Wave soldering is a process of mass soldering electronic circuit board assemblies. The circuit boards loaded with the electronic components to be soldered are placed on an automated "transport carrier". The carrier transports the circuit boards through a series of fluxing (cleaning) steps and preheat stations before finally lowering the circuit boards into a molten vat of tin/lead solder. All of the components are soldered at one time in this procedure, creating solid solder joints in one rapid process.

Although the present invention's preferred embodiment and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What we claim as our invention is:

1. A newspaper dispensing machine for daily newspapers comprising:

a normally closed dispenser housing for storing and dispensing daily newspaper publications each of which newspapers has a plurality of pages, said dispenser having means therein to permit the dispensing of the stored newspapers one-at-a-time from the dispenser housing;

means for receiving and processing remote transmitted signals operatively associated with said housing dispenser;

newspaper printer means electrically connected to said means for receiving and processing said remote transmitted signals to print processed intelligent information on at least one of said daily newspaper pages stored in said housing dispenser; and means for opening said normally closed housing dispenser in response to the insertion of one or more elements representing value into the dispenser to permit the release of a newspaper with said printed information thereon.

2. The invention as claimed in claim 1, wherein said element inserted into the dispenser representing value is a subscription card with encoded values thereon.

3. The invention as claimed in claim 1, wherein said element representing value is a governmental issued currency.

4. The invention as claimed in claim 1, wherein said element representing value is a debit credit card.

5. The invention as claimed in claim 1, wherein said dispenser has a visual display screen which displays said intelligent information printed on the publication.

6. The invention as claimed in claim 1, wherein said dispenser publication has the most recent print processed information available printed on it.

7. The invention as claimed in claim 6, wherein the subject matter of the print processed intelligent information printed can be selected by a user from a menu of different subjects visually displayed on the dispenser.

* * * * *